US007337332B2

(12) United States Patent
Tsuria et al.

(10) Patent No.: US 7,337,332 B2
(45) Date of Patent: Feb. 26, 2008

(54) TRANSFERRING ELECTRONIC CONTENT

(75) Inventors: Yossi Tsuria, Jerusalem (IL); Stephanie Wald, Givat Zeev (IL)

(73) Assignee: NDS Ltd., Middlesex (GB)

( * ) Notice: Subject to any disclaimer, the term of this patent is extended or adjusted under 35 U.S.C. 154(b) by 524 days.

(21) Appl. No.: 10/399,747

(22) PCT Filed: Jul. 10, 2001

(86) PCT No.: PCT/IL01/00631

§ 371 (c)(1),
(2), (4) Date: Jul. 8, 2003

(87) PCT Pub. No.: WO02/35327

PCT Pub. Date: May 2, 2002

(65) Prior Publication Data

US 2004/0030898 A1   Feb. 12, 2004

Related U.S. Application Data

(60) Provisional application No. 60/274,998, filed on Mar. 12, 2001.

(30) Foreign Application Priority Data

Oct. 24, 2000 (IL) .................................. 139251

(51) Int. Cl.
*G06F 21/00* (2006.01)

(52) U.S. Cl. ..................... 713/193; 713/169; 713/170; 713/171; 713/172; 380/281; 380/283; 380/284; 705/64; 705/65; 705/67; 705/71

(58) Field of Classification Search .................. 380/47, 380/28–30, 281, 283, 284; 713/193, 169, 713/170, 171, 172; 705/64, 65, 67, 71
See application file for complete search history.

(56) References Cited

U.S. PATENT DOCUMENTS

| | | | | |
|---|---|---|---|---|
| 5,109,413 A | * | 4/1992 | Comerford et al. ............ 705/54 |
| 5,438,508 A | * | 8/1995 | Wyman .......................... 705/8 |
| 5,509,074 A | * | 4/1996 | Choudhury et al. ......... 713/176 |
| 5,646,999 A | * | 7/1997 | Saito ............................ 705/54 |
| 5,848,158 A | | 12/1998 | Saito et al. | |

FOREIGN PATENT DOCUMENTS

| | | |
|---|---|---|
| EP | 0 268 139 A2 | 5/1988 |
| EP | 0 833 241 A2 | 4/1998 |
| EP | 0 999 488 A2 | 5/2000 |
| WO | 00/08909 A2 | 2/2000 |
| WO | 00/20950 A1 | 4/2000 |

* cited by examiner

Primary Examiner—Kambiz Zand
Assistant Examiner—Tongoc Tran
(74) Attorney, Agent, or Firm—Welsh & Katz Ltd.

(57) ABSTRACT

A method and apparatus for transferring electronic content. The method and apparatus include providing electronic content to a first user, providing the first user with a key packet, the key packet including a decryption key and content rights information, transferring the electronic content and the key packet from the first user to a second user and rendering rights of the first user to the electronic content unusable upon transfer of the electronic content and the key packet from the first user to the second user.

14 Claims, 2 Drawing Sheets

TRANSFERRING ELECTRONIC CONTENT

The present application is a 35 USC §371 application of PCT/IL01/00631, filed on 10 Jul. 2001 and entitled Transferring Electronic Content, which was published on 2 May 2002 in the English language with International Publication Number WO 02/35327 A2, and which relies for priority on Israel Patent Application No. 139251 filed 24 Oct. 2000 and on U.S. Provisional Patent Application Ser. No. 60/274,998, filed on 12 Mar. 2001.

FIELD OF THE INVENTION

The present invention relates generally to methods for transferring electronic content received from an electronic delivery source, from one user to another user or back to the source.

BACKGROUND OF THE INVENTION

Many kinds of electronic content are delivered over the Internet, such as articles, catalog pages, electronic books, music, etc. For example, VERSAWARE.COM provides consumers with electronic library capability, wherein the consumer can store data culled from reference books, encyclopedias, almanacs and the like. Many systems require the consumer to purchase the content or at least pay for use of the content. In such cases, downloading of the content is usually secured by an encrypted link.

When a consumer buys a tangible item, for example, a book or souvenir from a store, the consumer can transfer the item to another consumer, such as by selling, lending or renting the item. However, when a consumer purchases or pays for the use of electronic content, many kinds of electronic delivery systems prevent the consumer from transferring the content to another.

The following example is a classic case in point. A university student typically purchases text books at the beginning of a semester, and resells the books, either back to the store or to another student, usually at a lower price. If the student drops out of the course for some reason, is perhaps dissatisfied with the particular book, or has never even read the book, he/she can usually return the book to the store. However, the situation is different in the event that a student downloads an electronic book from the web. First, as mentioned above, the electronic delivery system generally prevents the student from transferring the content to another person. Second, even if the student did not read or use the electronic content, it is not generally possible to return the content to the provider and receive one's money back.

Systems are known in the prior art for protecting against unauthorized distribution of documents that were received by a consumer from an electronic content provider. European Patent EP 999488, assigned to XEROX Corporation, describes a system for creating a self-protected document, and which prevents users from obtaining a useful form of an electronically distributed document during the decryption and rendering processes. The system has a polarization key which is used by a polarizer to transform the document to a version having polarized contents. The polarization key represents a combination of data elements taken from the user system's internal state, such as the date and time of day, elapsed time since the last keystroke, the processor's speed and serial number, and any other information that can be repeatably derived from the user system. Time-derived information may also be included in the polarization key so that interception and seizure of the polarized contents is rendered useless.

Published PCT patent application WO 00/08909, assigned to IBM Corporation, describes a secure digital content distribution system that decrypts a decryption key from an encrypted decrypting key. The decrypted decrypting key is transferred to another system. The secure digital content distribution system is capable of communicating with another system which is capable of receiving data encrypted with the encryption key and the encrypted encryption key. The system enables making digital content available to a wide range of users and businesses while ensuring protection and metering of digital assets. The system includes rights management to allow secure delivery, licensing, authorization, and control of the usage of digital assets. The system provides retailers of electronic content a way to differentiate themselves from each other and the content owners when selling music through electronic distribution.

In the WO 00/08909 system, a clearinghouse is maintained by the system for the management of the electronic content (see pages 52-53 of WO 00/08909, entitled "A. Overview"). Content rights may be transferred by electronic digital content stores, content providers or by authorized end-user devices. However, every transfer of rights, even from one authorized end-user device to another, must always be authorized by and transacted through the clearinghouse. It is not possible for an authorized end-user device to transfer content rights independently of the clearinghouse.

SUMMARY OF THE INVENTION

The present invention seeks to provide novel methods for transferring electronic content received from an electronic delivery source, from one user to another user or back to the source, without having to enact the transaction via a clearinghouse or other central authority. The present invention uniquely enables electronic content transfer from one user by means of "chaining".

The term "chaining", as used in the present specification and claims, refers to transferring the electronic content plus a packet of information, herein referred to as a key packet, from a first user entity to a second user entity. The key packet includes, for example and inter alia, one or more encrypted keys, preferably comprising one or more decryption keys encrypted according to at least one appropriate key encryption key, and content rights information. The key packet is preferably transferred from a first user entity to a second user entity, wherein the first user entity's rights to the content and key packet information are rendered unusable upon creation of a new key packet and its transfer to the second user entity.

As is well known in the art of encryption and decryption, keys which are used primarily to encrypt other keys are known as "key encryption keys". Throughout the present specification and claims, keys which are used primarily to encrypt other keys, even if used also for other purposes, will be referred to as "key encryption keys".

In a preferred embodiment of the present invention, the first user entity can repeatedly send the key packet or packets, so that in a case of communication failure, the second user entity can request the key packets again. In general, after transfer of the newly encrypted content and key packet, the first user entity deletes its now unusable key packet or content. In one preferred embodiment of the present invention, the method does not require irrevocable proof that the second user entity has received the content, nor does it require subsequent deletion of the content or key packets; in other preferred embodiments, irrevocable proof and/or subsequent deletion may be required.

The communication line from the first user entity to the second user entity does not need to be secure. Instead, the present invention preferably uses a security device, most preferably a smart card, to secure the transfer of the content and key packet from the first user entity to the second user entity. The communication between the two users is secured by using a key derived for that communication session from a secure protocol to encrypt the data such that it can neither be forged nor intercepted by a third party.

There is thus provided in accordance with a preferred embodiment of the present invention a method for transferring electronic content, including providing electronic content to a first user, providing the first user with a key packet, the key packet including a decryption key and content rights information, transferring the electronic content and the key packet from the first user to a second user, and rendering rights of the first user to the electronic content unusable upon transfer of the electronic content and the key packet from the first user to the second user. The electronic content may be provided to the first user from a content provider or from a previous user.

In accordance with a preferred embodiment of the present invention the method further includes rendering rights of the first user to the key packet unusable upon transfer of the electronic content and the key packet from the first user to the second user.

Further in accordance with a preferred embodiment of the present invention the electronic content and the key packet are stored in a first content reader and the step of transferring includes transferring the electronic content and the key packet from the first content reader to a second content reader.

Still further in accordance with a preferred embodiment of the present invention a security device is used to secure communication between the first and second content readers.

In accordance with a preferred embodiment of the present invention the security device includes a first smart card associated with the first content reader which communicates with a second smart card associated with the second content reader.

Further in accordance with a preferred embodiment of the present invention the step of rendering includes using the first smart card to mark the electronic content and key packet as being unfit for use by the first content reader.

Still further in accordance with a preferred embodiment of the present invention the first and second smart cards carry out a mutual authentication process so as to establish a secure session between the first and second content readers.

Additionally in accordance with a preferred embodiment of the present invention the mutual authentication process includes a mutual zero-knowledge interaction authentication process.

In accordance with a preferred embodiment of the present invention the method further includes sending a key encryption key from the second user to the first user, and creating a new key packet for the second user, the new key packet including a content decryption key at least partially encrypted with the key encryption key, and wherein the step of transferring includes transferring the new key packet to the second user.

In a preferred embodiment of the present invention, the content is sent without re-encryption: the same content decryption key is used by the second user as was used by the first user; the same content decryption key has been delivered to the second user encrypted with that second user's key encryption key.

Further in accordance with a preferred embodiment of the present invention the method includes re-encrypting the content using the second user's content encryption key. The second user's content encryption key may or may not be the same as the first user's content encryption key. The encryption may take place either within the smart card or within the first content reader.

Further in accordance with a preferred embodiment of the present invention the method includes using the second smart card to send an encryption key from the second user to the first user, and using the first smart card to create a new key packet for the second user, the new key packet including the electronic content and previous key packet at least partially encrypted with the encryption key, and wherein the step of transferring includes transferring the new key packet to the second user.

Still further in accordance with a preferred embodiment of the present invention the second smart card delivers a transfer request message to the first smart card prior to transferring the new key packet.

Additionally in accordance with a preferred embodiment of the present invention the step of sending an encryption key is performed during a mutual authentication process between the first and second smart cards.

In accordance with a preferred embodiment of the present invention the method further includes sending a unique user ID during a mutual authentication process between the first and second smart cards.

Further in accordance with a preferred embodiment of the present invention the encryption key is sent with the transfer request message.

Still further in accordance with a preferred embodiment of the present invention the transfer request message includes a unique identification of the electronic content.

Additionally in accordance with a preferred embodiment of the present invention the transfer request message includes an e-cash transfer in a mutually-agreed-upon amount.

In accordance with a preferred embodiment of the present invention the transfer request message includes a unique user ID.

Further in accordance with a preferred embodiment of the present invention if the second content reader sends a confirmation of receipt to the first content reader, the first content reader deletes the now-unusable key packet.

Still further in accordance with a preferred embodiment of the present invention if the second content reader sends a confirmation of receipt to the first content reader, the first content reader deletes the electronic content.

In accordance with a preferred embodiment of the present invention if the second content reader sends a confirmation of receipt to the first content reader, the first content reader deletes the new electronic content, encrypted according to the second user's content encryption key, and/or and the new key packet. Alternatively, it is appreciated that the first content reader need not store the new electronic content, but may merely re-encrypt "on-the-fly" during transmission to the second content reader. Further alternatively, as also described herein, it is appreciated that re-encryption of the electronic content may be optional.

Further in accordance with a preferred embodiment of the present invention if a predetermined period of time has elapsed, the first content reader deletes the new electronic content and the new key packet.

Additionally in accordance with a preferred embodiment of the present invention if the second content reader requests the new key packet again from the first content reader, the first content reader resends the new key packet.

In accordance with a preferred embodiment of the present invention the second user is the content provider. Alternatively, the first user is the content provider.

Further in accordance with a preferred embodiment of the present invention the key packet is divided into a main packet and at least one dependent packet.

Still further in accordance with a preferred embodiment of the present invention information is stored as to whether the at least one dependent packet was accessed by the first user. A refund may be provided if the at least one dependent packet was not accessed by the first user.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
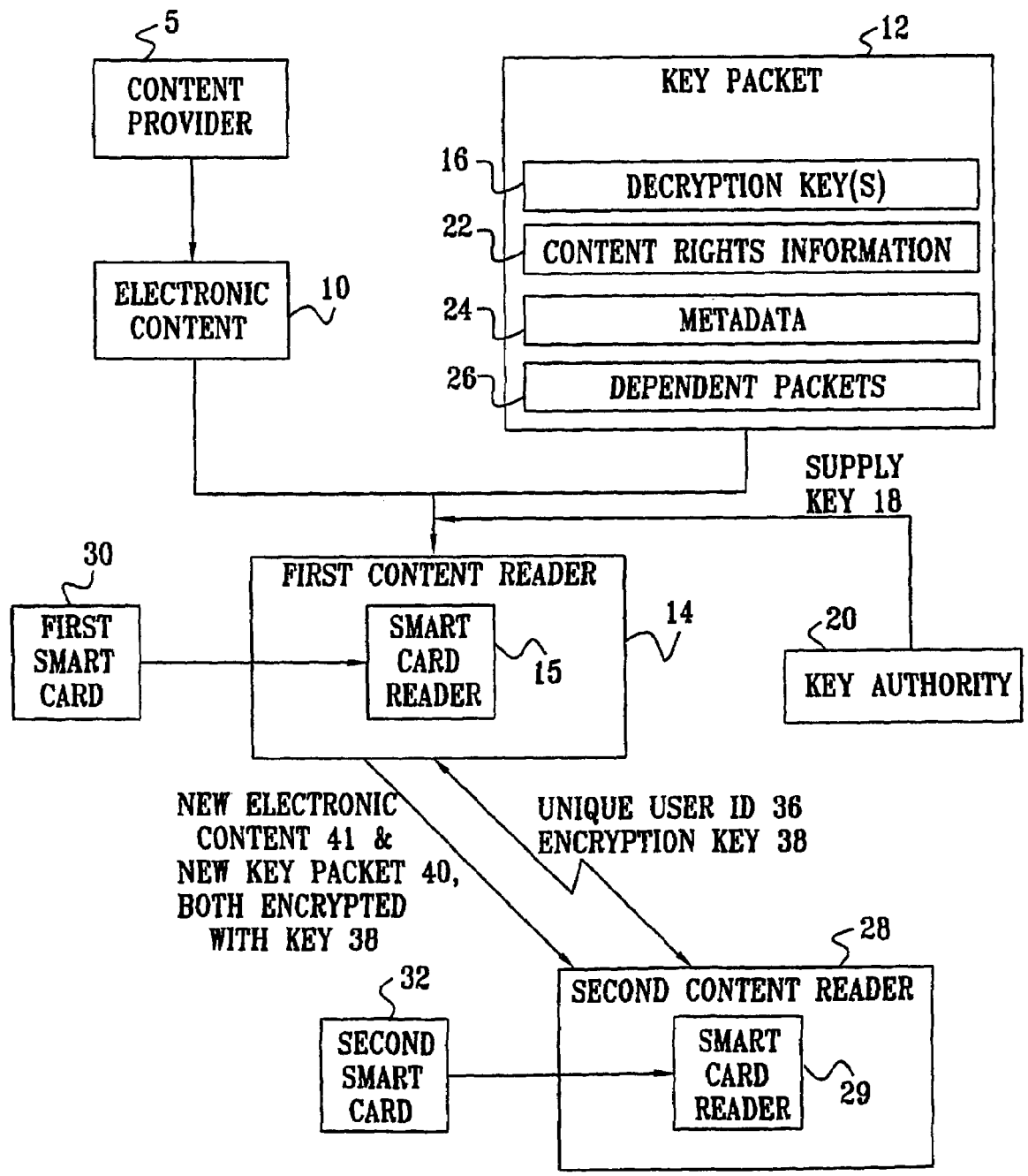
FIG. 1 is a simplified block diagram of a method for transferring electronic content, in accordance with a preferred embodiment of the present invention.

Reference is now made to FIG. 1 which illustrates a method for transferring electronic content, in accordance with a preferred embodiment of the present invention.

A source 5 of electronic content 10, also referred to as a content provider 5, preferably delivers electronic content 10 plus a "key packet" 12 to a first content reader 14 of a first user. It is appreciated that the source 5 may, in an alternative preferred embodiment of the present invention, be associated with the first user and further may be comprised in or operatively associated with the first content reader 14; in the alternative preferred embodiment, the first user is thus identified with the content provider 5.

The electronic content 10 may be any material transferred as digital data, such as MP3 music, digitally recorded video, electronic book files, electronic files of unpublished patent applications, and the like. The key packet 12 is defined as a personal packet for the purpose of delivering one or more decryption keys 16 related to the electronic content 10, to one and only one user. Each decryption key 16 is preferably encrypted using a subscriber's key encryption key 18, such as a public key which has been issued by a key authority 20 to the first user. It is appreciated that, in order to produce the key packet 12 in a case where at least one of the decryption keys 16 is encrypted with the subscriber's key encryption key 18, the key authority 20 must also supply the key encryption key 18 to the content provider 5 or to another source (not shown) of the key packet 12; alternatively, it is well known in the art for public keys to be available such as, for example, from a public key server or directly from the owner of the public key. Appropriate key handling protocols for carrying out such transfers of the key encryption key 18 are well known in the art.

The key packet 12 preferably includes the encrypted decryption key 16, content rights information 22 and other optional metadata 24. The key packet 12 may be divided into a main packet and one or more dependent packets 26. For example, there may be one main packet for the title of the electronic content 10, plus dependent packets 26 for each segment or chapter. The decryption key 16 for the title is preferably used to decrypt the segment keys. Alternatively, the dependent packets may, for example, be encrypted with the key encryption key 18. It will be appreciated by persons skilled in the art that other alternatives are possible.

The first content reader 14 preferably comprises any appropriate electronic device capable of reading the inputted electronic content 10 and key packet 12, and providing a digital output to a second content reader 28. It is believed that, in a preferred embodiment of the present invention, the connection between the content readers 14 and 28 does not need to be secure. Rather, in a preferred embodiment of the present invention, security devices, most preferably a first smart card 30 and a second smart card 32, are used to secure the transfer of the content 10 and the key packet 12 from the first content reader 14 to the second content reader 28. Accordingly, smart card readers 15 and 29 are provided which are in electrical communication with first and second content readers 14 and 28, and are preferably housed together with first and second content readers 14 and 28.

As is well known in the art, the first smart card 30 and the second smart card 32 are preferably designed and programmed to carry out only operations which are authorized, such as, for example, operations which are authorized by a content owner. Thus, the first smart card 30 and the second smart card 32 are, at least to some extent, trusted devices which may be trusted to carry out their assigned operations and which may not usually be arbitrarily forced to carry out unauthorized operations by a user of the system of FIG. 1.

Figure 2:
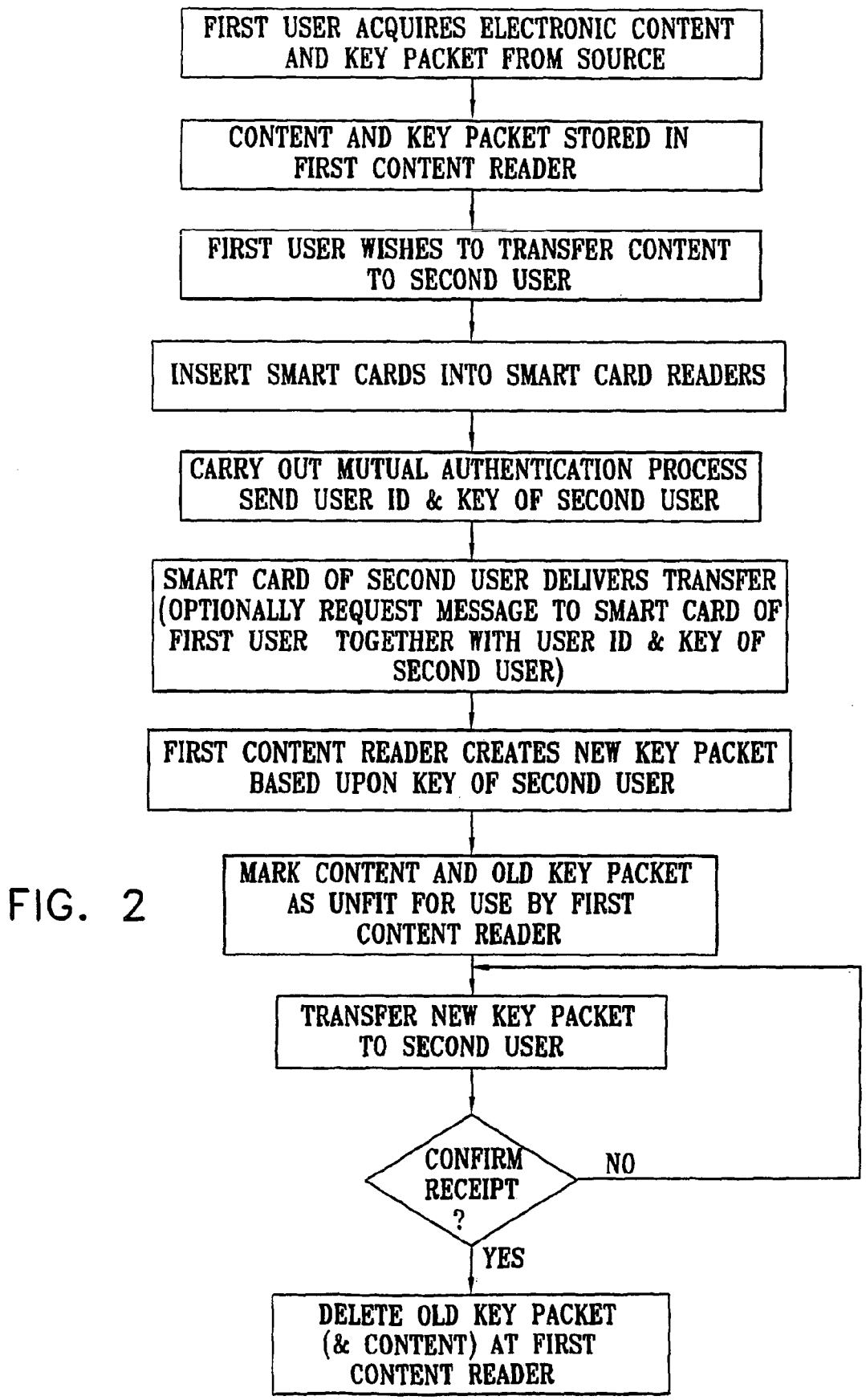
FIG. 2 is a simplified flow chart of the method for transferring electronic content, in accordance with a preferred embodiment of the present invention.

Reference is now made to FIG. 2 which illustrates in flow chart form a preferred method of the present invention. A first user acquires the electronic content 10 and key packets 12 from the source 5. The content 10 and key packet 12 are stored by first content reader 14. The first user wishes to transfer content 10 to a second user for a price mutually agreed upon or upon any other appropriate terms. The second user can be another "end user", such as in a transaction between fellow students at a university. Alternatively, the second user can be the content provider 5 itself, such as in the case of returning unused or unread content back to the provider. First content reader 14 is preferably in electrical communication (wired or wireless) with second content reader 28 for the purpose of the transfer of information.

Smart cards 30 and 32 are respectively inserted in smart card readers 15 and 29. Smart card 30 preferably carries out a mutual authentication process with smart card 32, such as the so-called Fiat-Shamir mutual zero-knowledge interaction authentication methods taught in U.S. Pat. Nos. 4,748,668 to Shamir and Fiat, and 4,933,970 to Shamir, the disclosures of which are incorporated herein by reference. Smart cards 30 and 32 preferably establish a secure session between first and second content readers 14 and 28 using any standard or proprietary session protocol.

Smart card 32 preferably delivers a transfer request message to smart card 30. The message preferably includes unique identification of the electronic content 10 and an e-cash transfer in a mutually-agreed-upon amount. A unique user ID 36 and a new key encryption key 38 of the second user (such as a public key which has been issued by a key authority to the second user, for example) are preferably transferred as part of the authentication protocol or secure session establishment between smart card 30 and 32. Alternatively, the ID 36 and key 38 may be included in the transfer request message.

It is noted that technology for transferring information from one smart card to another is well known and described, for example, in UK Patent 2311451, assigned to the present assignee/applicant, the disclosure of which is incorporated herein by reference. It is noted, however, that UK Patent 2311451 does not deal with chaining as defined hereinabove, rather with using one smart card to deactivate or activate another smart card.

First content reader 14 preferably creates a new key packet 40 and optionally, but not necessarily, a new electronic content 41 for second content reader 28 based upon a new key encryption key 38 of the second user. It is believed to be sufficient, in a preferred embodiment of the present invention, that the content key has now been re-encrypted with the new key encryption key 38, in the new key packet 40, such that the new electronic content 41 would be preferably identical to the electronic content 10.

The new key packet 40 preferably includes the same information as the key packet 12, including encrypted key 16 as noted above, comprising the original key 16 re-encrypted for the second user with the second user's key encryption key, the new key encryption key 38.

In an alternative preferred embodiment, in which the content is to be re-encrypted, a different key may be used, either a single key for content-re-encryption and for key encryption, or different keys for content-re-encryption and for key encryption. Performing content re-encryption is believed to be more secure but may require more hardware to perform encryption of content. Alternatively, primary encryption using the original content provider's key and secondary local encryption of a simple type could be performed. In the alternative preferred embodiment of the present invention, where new electronic content 41 is re-encrypted such as, for example, with the new key encryption key 38 (here used not only to encrypt a key but also to encrypt content), such encryption preferably takes place "on the fly", without storing the new electronic content 41 in the first content reader 14.

It is appreciated that various methods of re-encryption will occur to persons skilled in the art, and that any appropriate re-encryption method may be used.

The new key packet also preferably includes content rights information 22 and other optional metadata 24, now encrypted according to the new key encryption key 38.

It is noted that all of the key packet 12 may be encrypted according to the new key encryption key 38, or alternatively, only a portion thereof, such as the decryption keys for some of the dependent packets 26, may be so encrypted, while other decryption keys remain encrypted with key(s) 16. Smart card 30 also preferably marks electronic content 10 and key packet 12 as being unfit for use, i.e., undecodable or inaccessible, by first content reader 14.

First content reader 14 then transfers new key packet 40 and newly encrypted electronic content 41 to second content reader 28. If second content reader 28 sends a confirmation of receipt, first content reader 14 preferably deletes the now-unusable key packet 12 and may optionally delete the electronic content 10. However, it is noted that the method does not require irrevocable proof that second content reader 28 has received the content 10 and subsequent deletion of content 10 or key packet 12 by first content reader 14. First content reader 14 can repeatedly send new key packets and content to the second content reader 28, so that in a case of communication failure, second content reader 28 may request the key packets and content again.

The electronic content 41 and key packet 40 can be transferred from the second user to a third user, ad infinitum, in the same manner as the electronic content 10 and key packet 12 were transferred from the first user to the second user, as described hereinabove. In such a case, it is preferable that the first content reader 14 be incapable of repeatedly sending new key packets and content to second content reader 28. Instead, if second content reader 28 sends a confirmation of receipt or if a predetermined period of time has elapsed, first content reader 14 preferably deletes new key packet 40 and electronic content 41, thereby rendering first content reader 14 incapable of sending new key packets and content to the second user without repeating the entire process of the sate, in the case where the first user is entitled according to the content rights to sell it more than once.

As similarly described hereinabove, second smart card 32 preferably deletes its key packets and electronic content after sending them to the third user. This provides important added security to the method of the invention, in the event that first smart card 30 is "hacked" but second smart card 32 remains secure.

The term "hacked" in its various grammatical forms, as is well known in the art, refers to a case where an unscrupulous person causes a smart card or other secure device to behave in other than its intended manner, so that the hacked smart card can no longer be trusted to carry out its assigned operations and may now be arbitrarily forced to carry out unauthorized operations.

The basic method of the present invention, as shown, for example, in the preferred method of FIG. 2, can be varied to suit a particular user or application. For example, roll back of the transaction between the content readers 14 and 28 may be supported by repeating the transfer in the opposite direction. In another feature, the rights contained in the new key packet 40 may limit the price at which the content 10 may be transferred to less than the price paid by the first user. In yet another feature, the content 10 may be transferred along with additional material created by the first user at a price higher than the original content. As described above, the first user may or may not be limited in having the right to sell it to more than one "second" user.

The methods of the present invention thus enable transferring electronic content without having to enact the transaction via a clearinghouse or other central authority. It is clear from the foregoing description, that the second user does not need to be another "end user", rather the second user can be the content provider 5 itself In such a case, in contrast to the prior art, if the first user did not read or use the electronic content 10, the first user can indeed return the content 10 to the content provider 5 and receive his/her money back. (In the above described embodiment, this can be accomplished by storing in smart card 30 information as to which of the dependent packets 26 were accessed.) Alternatively, instead of paying back money, the content provider 5 can transfer tokens to the first user (e.g., bookstore coupons). In a case where the second user is the content provider 5 itself and the content is being "returned", it is appreciated that the electronic content 10 itself need not actually be sent back to the content provider 5, as long as the electronic content 10 has been marked as inaccessible and/or deleted as described above.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A method for transferring electronic content including multiple portions, comprising:

providing electronic content to a first user via a first user's smart card enabled device;

providing the first user with a first key packet useful by said first user's smart card enabled device for decrypting said electronic content, said first key packet comprising a first main decryption key and a plurality of dependent decryption keys encrypted by said first main key, each of said plurality of dependent decryption keys being useful for decrypting at least one of said multiple portions of said electronic content, said first key packet being operative to enable creation of a second key packet, at said first user's smart card enabled device, comprising a second main decryption key and said plurality of dependent decryption keys, at least some of which are encrypted by said second main key; and transferring of said electronic content and said second key packet from the first user to a second user.

2. The method according to claim 1 and further comprising rendering rights of the first user to said first key packet unusable upon transfer of said electronic content and said second key packet from the first user to the second user.

3. The method according to claim 1 wherein said electronic content and said first key packet are stored in a first content reader comprised in said first user's smart card enabled device and the step of transferring comprises transferring said electronic content and said second key packet from said first content reader to a second content reader comprised in a second user's smart card enabled device.

4. The method according to claim 3 wherein a security device is used to secure communication between said first and second content readers.

5. The method according to claim 4 wherein said security device comprises a first smart card associated with said first content reader which communicates with a second smart card associated with said second content reader.

6. The method according to claim 5 and further comprising rendering rights of the first user to said first key packet unusable upon transfer of said electronic content and said second key packet from the first user to the second user, wherein said rendering comprises using said first smart card to mark at least one of the following as being unfit for use by said first content reader: said electronic content; and said first key packet.

7. The method according to claim 5 wherein said first and second smart cards carry out a mutual authentication process so as to establish a secure session between said first and second content readers.

8. The method according to claim 7 wherein said mutual authentication process comprises a mutual zero-knowledge interaction authentication process.

9. The method according to claim 1 and further comprising:

sending a key encryption key from said second user to said first user, said second main decryption key comprising said key encryption key.

10. The method according to claim 5 wherein said second smart card delivers a transfer request message to said first smart card prior to said transferring of said electronic content and said second key packet.

11. The method according to claim 3 wherein if said second content reader sends a confirmation of receipt to said first content reader, said first content reader deletes the now-unusable first key packet.

12. The method according to claim 3 wherein if said second content reader sends a confirmation of receipt to said first content reader, said first content reader deletes said electronic content.

13. Apparatus for transferring electronic content including multiple portions, comprising:

a content provider for providing electronic content to a first user via a first user's smart card enabled device;

a key packet provider for providing the first user with a first key packet useful by said first user's smart card enabled device for decrypting said electronic content, said first key packet comprising a first main decryption key and a plurality of dependent decryption keys encrypted by said first main key, each of said plurality of dependent decryption keys being useful for decrypting at least one of said multiple portions of said electronic content, said first key packet being operative to enable creation of a second key packet, at said first user's smart card enabled device, comprising a second main decryption key and said plurality of dependent decryption keys, at least some of which are encrypted by said second main key; and a content transferor for transferring of said electronic content and said second key packet from the first user to a second user.

14. Apparatus for transferring electronic content including multiple portions, comprising:

means for providing electronic content to a first user via a first user's smart card enabled device;

means for providing the first user with a first key packet useful by said first user's smart card enabled device for decrypting said electronic content, said first key packet comprising a first main decryption key and a plurality of dependent decryption keys encrypted by said first main key, each of said plurality of dependent decryption keys being useful for decrypting at least one of said multiple portions of said electronic content, said first key packet being operative to enable creation of a second key packet, at said first user's smart card enabled device, comprising a second main decryption key and said plurality of dependent decryption keys, at least some of which are encrypted by said second main key; and means for transferring of said electronic content and said second key packet from the first user to a second user.

* * * * *

UNITED STATES PATENT AND TRADEMARK OFFICE
CERTIFICATE OF CORRECTION

PATENT NO. : 7,337,332 B2  Page 1 of 1
APPLICATION NO. : 10/399747
DATED : February 26, 2008
INVENTOR(S) : Tsuria et al.

It is certified that error appears in the above-identified patent and that said Letters Patent is hereby corrected as shown below:

In column 8, line 9, delete "sate," and insert therefor --sale,--.

In column 8, line 42, delete "itself In" and insert therefor --itself. In--.

Signed and Sealed this

Third Day of February, 2009

JOHN DOLL
*Acting Director of the United States Patent and Trademark Office*